United States Patent [19]

Lenain et al.

[11] Patent Number: 5,339,364
[45] Date of Patent: Aug. 16, 1994

[54] DEVICE FOR CONVERSION BETWEEN ELECTRICAL OSCILLATIONS AND ACOUSTIC WAVES

[75] Inventors: Jean-Francois Lenain, Coudray; Alfred Bientz, Chateau-Gontier, both of France

[73] Assignee: Molex Incorporated, Lisle, Ill.

[21] Appl. No.: 36,605

[22] Filed: Mar. 24, 1993

[30] Foreign Application Priority Data

Mar. 24, 1992 [DE] Fed. Rep. of Germany ....... 4209595

[51] Int. Cl.$^5$ .............................................. H04R 25/00
[52] U.S. Cl. ................................... 381/173; 381/157; 379/433
[58] Field of Search ................ 381/173, 190, 168, 157; 379/433, 428, 434; 310/324

[56] References Cited

U.S. PATENT DOCUMENTS

| | | | |
|---|---|---|---|
| 4,063,049 | 12/1977 | Pipitone et al. | 381/173 |
| 4,295,009 | 10/1981 | Weidler | 381/205 |
| 4,594,478 | 6/1986 | Gumb et al. | 381/173 |
| 4,984,268 | 1/1991 | Brown et al. | 379/433 |
| 5,231,659 | 7/1993 | Abraham et al. | 381/173 |

FOREIGN PATENT DOCUMENTS 0081799  5/1982  Japan ................... 381/190

*Primary Examiner*—Curtis Kuntz
*Assistant Examiner*—Huyen Le
*Attorney, Agent, or Firm*—Stacey E. Caldwell

[57] ABSTRACT

A device for the conversion of electrical oscillations into acoustic waves or the conversion of acoustic waves into electrical oscillations, including an electro-acoustic converter and a housing with two housing shells (1, 2) in the form of plastic moldings. The housing shells fit together and are assembled into a single closed housing assembly with a sound window (8) associated with the electro-acoustic converter, conductive portions of external leads (10) are attached to the housing through contact elements (9) located on one of the shells. A piezoelectric element (4) is combined with a carrier foil (11) which includes a sound membrane (3). The carrier foil includes conductors connected to the piezoelectric element in the form of screen-printed conductive traces (12), the ends of which, remote from the piezoelectric element, are provided with a contact arrangement (14). Other functional components, including the contact elements, are situated on or in the housing shells. The functional components are brought into functional association by joining the housing shells together to form the single housing assembly after inserting the carrier foil with the piezoelectric element into one of the housing shells.

10 Claims, 2 Drawing Sheets

DEVICE FOR CONVERSION BETWEEN ELECTRICAL OSCILLATIONS AND ACOUSTIC WAVES

FIELD OF THE INVENTION

This invention generally relates to electrical oscillation and acoustic wave conversion and, particularly, to a device for converting electrical oscillations into acoustic waves or converting acoustic waves into electrical oscillations, including an electro-acoustic converter and a housing with at least two housing shells in the form of plastic moldings. In particular, the device includes a sound membrane, a piezoelectric element, electrically conductive traces connected to the piezoelectric element, acoustic elements, and mechanical retaining elements, all functionally interconnected and associated. The two housing shells fit together to form a single closed housing assembly having a sound window associated with the electro-acoustic converter. The acoustic waves are in the form of sound waves picked up by the electro-acoustic converter operating as a receiver and converted into electrical oscillations—or vice versa. The electrical oscillations generated are in the form of electrical voltages and currents which fluctuate in rhythm with the sound vibrations and which are propagated along the electrical traces. They are actually denoted in Maxwellian strictness as electromagnetic oscillations. The acoustic elements may also include resonance elements or resonance chambers.

BACKGROUND OF THE INVENTION

Devices converting electrical oscillations into acoustic waves, or vice versa, are known in various embodiments (cp. DE 31 04 860, DE 33 13 887, DE 35 25 724) namely in the form of telephone receivers which include an earpiece and a mouthpiece, connected together with a handle (cp. DE 33 41 251). The electro-acoustic conversion is performed by known measures, and, structurally, the converters typically include an assembly consisting of functional components inserted into multi-part housings. The housing parts do not operate as functional elements in the electro-acoustic conversion, but merely house the electro-acoustic converters and allow the sound waves, or electrical oscillations, to enter or emerge. For that purpose, acoustic windows in the form of perforated screens or the like are provided. However, the number of components in the converter on the one hand and the multi-part housing on the other is costly and time-consuming in terms of assembly and inventory. Flexible circuits, which include printed conductive traces, have been used in the area of electro-acoustic converters (cp. DE 29 06 893), however these have not contributed to a comprehensive simplification with respect to structure, manufacture or assembly. Wired circuits (cp. DE 33 41 251) are still typically used in practice.

SUMMARY OF THE INVENTION

The object of the invention, therefore, is to provide a simple device for the conversion of electrical oscillation into acoustic waves, and vice versa, in terms of structure, manufacturing and assembly.

To solve this task, a piezoelectric element is combined with a carrier foil or substrate which is designed as a sound membrane or includes such a membrane. The carrier foil includes electrically conductive traces printed thereon for connection to the piezoelectric element, the ends of the traces remote from the piezoelectric element being provided with contact areas adapted to connect to conductive portions of external leads. All other functional components are situated on or in the housing shells and are brought into functional association by joining the shells together to form a single housing assembly, wherein contact elements positioned on the housing common the contact areas of the carrier foil to the external conductive leads. The piezoelectric element may be formed as a ceramic piezoelectric plate, e.g. in the form of a thin circular disc, or as a piezoelectric polymer element in foil form. The carrier foil can be single or multi-layer foil, and the conductive traces may include a protective covering. The sound membrane is suitably equipped and from an acoustic viewpoint can be designed within the scope of the prevailing teaching.

According to the invention, the device is comprised of three simple components, including: a carrier foil or substrate with a piezoelectric element attached thereto, and two housing shells. An acoustic element, including a sound chamber, a resonator, and a sound channel, is formed on one of the housing shells. One of the housing shells also includes clamping surfaces for retaining and fixing the carrier foil thereto, and the other of the housing shells includes clamping counter-surfaces. The acoustic element may be constructed so as to include clamping surfaces and/or clamping counter surfaces.

According to the invention, the housing shells themselves act as resonators and result in improved acoustic performance. They also contribute to damping in certain frequency ranges (cp. DE 35 25 472, FIG. 21). In such an arrangement, the housing shells should be acoustically isolated from one another, e.g. by suitable layers. A preferred embodiment of this arrangement is characterized in that the housing shells are isolated from each other by the carrier foil, e.g. by clamping it around the edge between the housing shells.

The housing shells can be formed in various ways. In the preferred embodiment, the shells are injection molded or deep drawn from plastic, and the acoustic element, including clamping surfaces and clamping counter-surfaces, are integrally molded thereon. Integrally molded latches or locks may be included for latching the two housing shells together.

The invention is embodied in a telephone handset which includes an earpiece region and a mouthpiece region, connected by a handle. In such an arrangement, the functional components are contained primarily in the earpiece and mouthpiece regions, that is, two piezoelectric elements mounted on the carrier foil are located in the earpiece and mouthpiece regions, respectively and are connected by conductive traces on a foil-joining piece contained within the connecting handle.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
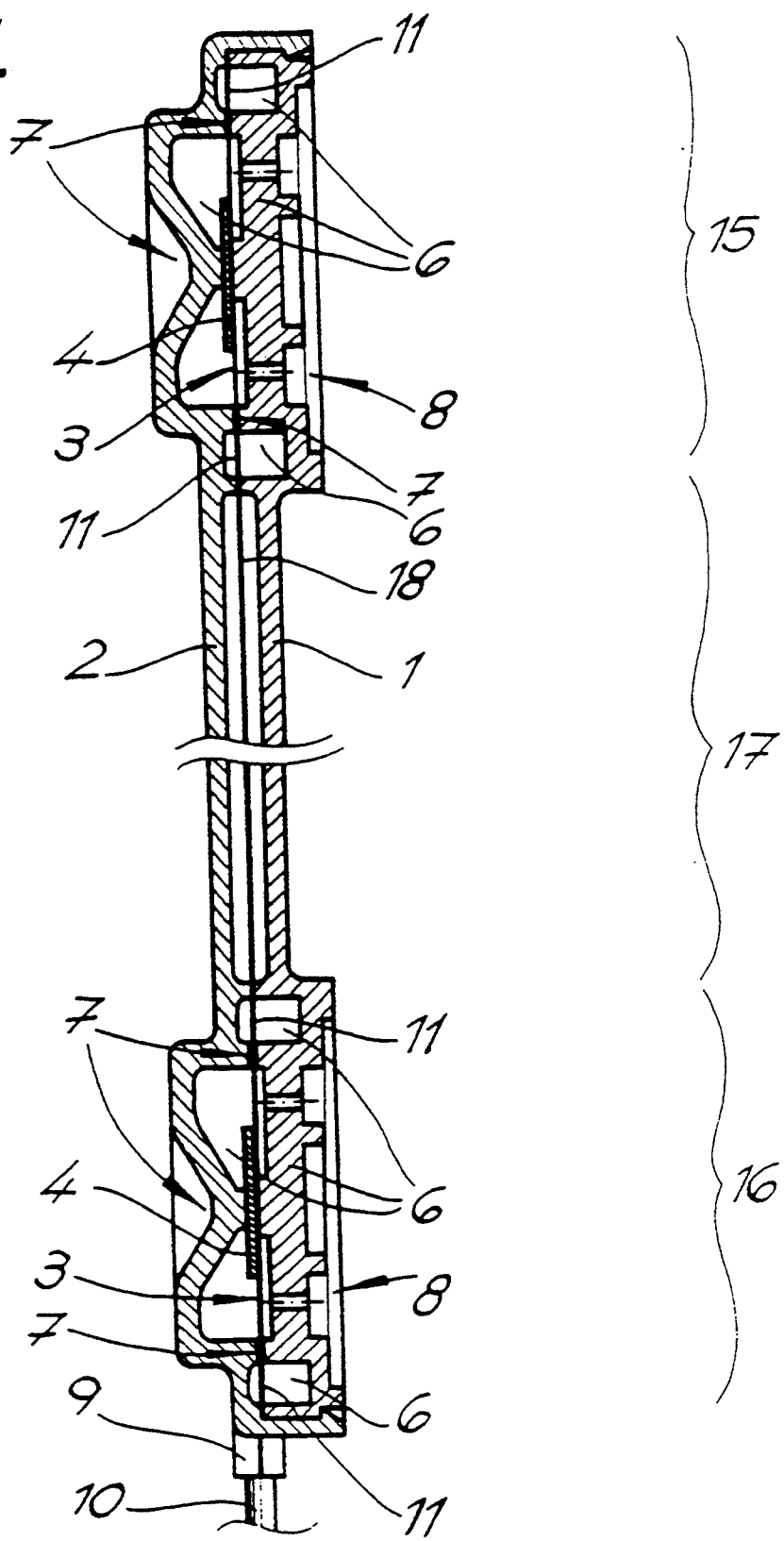
FIG. 1 is a longitudinal section through a device of the invention in the form of a telephone handset.

The invention is directed to a structure which converts electrical oscillations into acoustic waves or converts acoustic waves into electrical vibrations. The invention is embodied in a telephone handset, which includes at least one electro-acoustic converter and a housing having at least two housing shells 1, 2 formed, for example, by injection molding. The acoustic converter comprises a group of functionally associated components. In particular, it includes a sound membrane 3, a piezoelectric element 4, an electrical trace 5 connected thereto, an acoustic element 6 and a mechanical retainer 7. Housing shells 1, 2 fit together to form a single closed housing assembly enclosing the electro-acoustic converter, with sound windows 8 in the form of perforated screens disposed in front of the converter. Conductive portions of external leads 10 (FIG. 1) are connected to the internal circuitry described below through contact elements 9 positioned on the housing shells.

Figure 2:
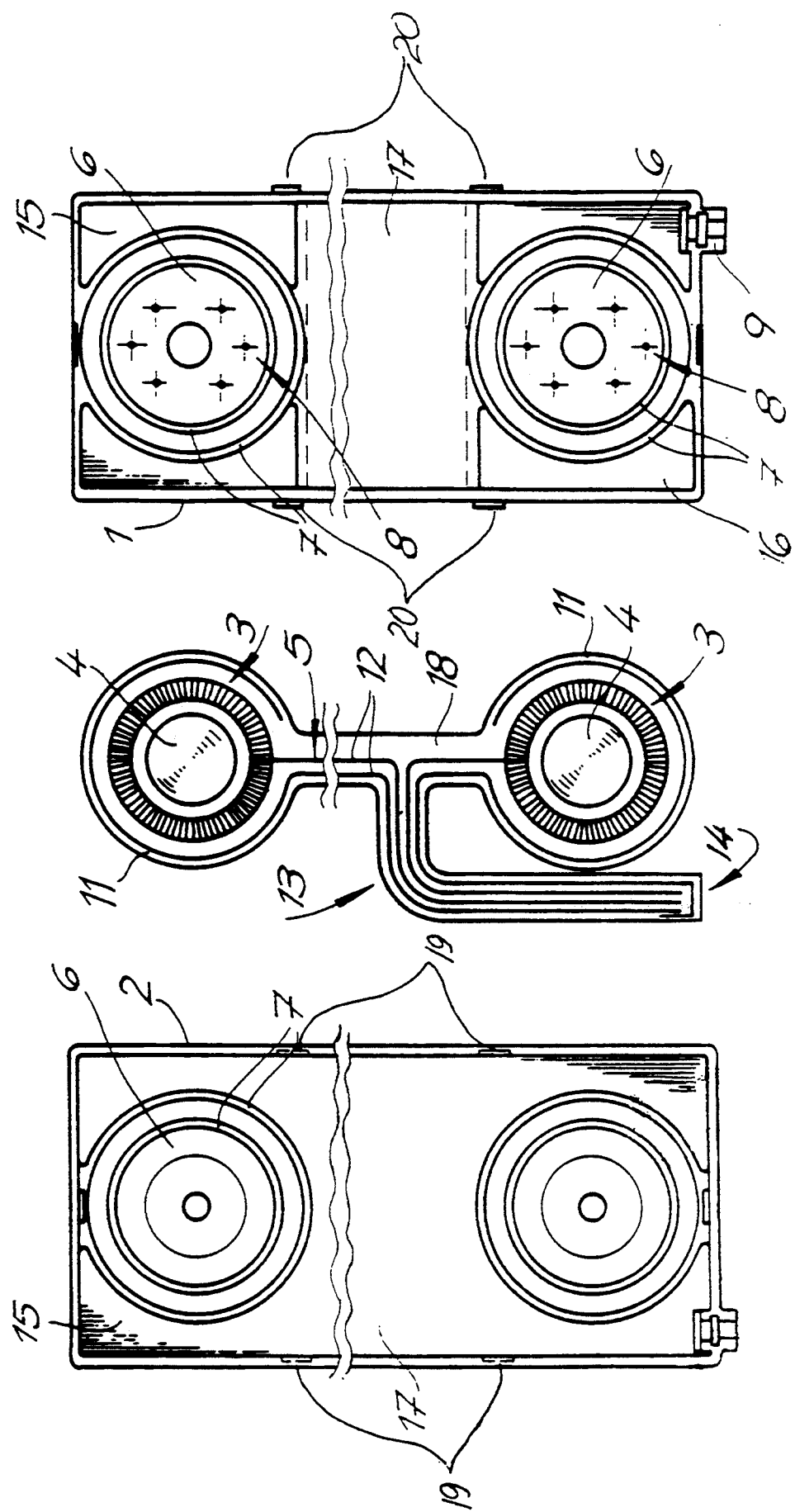
FIG. 2 is the subject of FIG. 1 opened out, with the piezoelectric elements, carrier foil, and connecting foil pieces situated between the opened shells.

As can be seen most clearly in FIG. 2, piezoelectric element 4 is mounted to carrier foil 11 which is formed as a sound membrane or includes such. Carrier foil 11 includes conductive printed ink traces 12, the ends of which, remote from the piezoelectric element, are provided with an extension 13 having a contact arrangement 14. One of the conductive printed ink traces, electrical trace 5, connects to piezoelectric element 4. All other functional parts, including acoustic element 6, mechanical retainer 7, and contacting elements 9, are situated on or in the housing shells 1, 2. Furthermore, the arrangement is such that, after inserting carrier foil 11 with piezoelectric element 4 in one of housing shells 1 or 2, the functional components, including acoustic element 6 and mechanical retainer 7, are brought into functional association with one another upon joining the housing shells 1, 2. At the same time, contact elements 9 on the housing shell 1 or 2 are brought into engagement with contact areas 14 of the conductive traces and conductive portions (not shown) of external leads 10. Complementary interengagement means 19, 20 located on the housing shells hold the two shells in locking interengagement. Piezoelectric element 4 may consist of ceramic plates or piezoelectric polymer elements in foil form. The carrier foil can be single or multi-layer foil, and the conductive traces may include a protective covering.

As seen most clearly in FIG. 2, acoustic elements 6, located in housing shell 1, include a sound chamber, a resonator, and a sound channel. One of the housing shells 1, 2 includes clamping surfaces 7 for clamping carrier foil 11 thereto and the other of the housing shells 1, 2 includes clamping counter-surfaces 7. Acoustic elements 6 may be formed as clamping surfaces 7 or clamping counter-surfaces 7. Housing shell 2 equipped with clamping counter-surfaces 7 can include additional acoustic elements 6, e.g. in the form of sound chambers. Not shown is that housing shells 1, 2 are acoustically insulated from each other, that is, the carrier foil 11 clamped between the housing shells in the region of clamping surface 7 and clamping counter-surface 7 effects an acoustic insulation.

Housing shells 1, 2 may be injection molded or deep-drawn from plastic. In either case, acoustic elements 6, clamping surfaces 7, and clamping counter-surfaces 7 may be formed as integral parts of housing shells 1, 2. The complementary interengaging means 19, 20 which hold the two housing shells together may be defined as integrally molded latches or locks.

The telephone handset is representative of the preferred embodiment of the invention. The handset includes an earpiece region 15 and a mouthpiece region 16, connected by a handle region 17. The functional parts, including acoustic element 6 and mechanical retainer 7, are situated or formed in the areas of earpiece region 15 and mouthpiece region 16, respectively. The parts of carrier foil 11 which correspond to earpiece region 15 and mouthpiece region 16 are electrically connected by a foil-joining piece 18 which extends through connecting handle region 17. Conductive traces 12 are imprinted on the foil-joining piece 18 and continue down extension 13 to contact arrangement 14.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A device for conversion between electrical oscillations and acoustic waves comprising:
an electro-acoustic converter including
   a carrier substrate (11) having an integrally formed sound membrane (3) and a piezoelectric element (4) mounted thereon, the carrier substrate (11) including a first region and a second region with a substrate joining region (18) therebetween, wherein said substrate-joining region includes at least one conductive trace (12) printed thereon connected at one end to the piezoelectric element (4); and
a housing assembly including
   two housing shells (1,2) one of the shells (1) having an integrally formed acoustic element (6) in the form of a sound window which adjoins a portion of the electro-acoustic converter and having a mechanical retainer (7) thereon for retaining the carrier substrate (11) within the housing assembly,
   the housing assembly further including complementary interengaging means on each of the two housing shells (1,2) for holding the two housing shells to one another,
   wherein the housing assembly is defined by a telephone handset including an earpiece region (15), a mouthpiece region (16), and a connecting handle region (17) therebetween, the first region of the carrier substrate (11) being positioned in the earpiece region (15), the second region of the circuit substrate being positioned in the mouthpiece region (16), and the substrate-joining region (18) of the carrier substrate being positioned in the connecting handle region (17).

2. The device as set forth in claim 1, wherein the complementary interengaging means (19, 20) are in the form of integrally mold latches on one of the housing shells and complementary latch surfaces on the other of the housing shells.

3. The device as set forth in claim 1, wherein the piezoelectric element (4) comprises a ceramic piezoelectric plate.

4. The device as set forth in claim 1, wherein the piezoelectric element (4) is a polymer element in foil form.

5. The device as set forth in claim 1, wherein the mechanical retainer (7) on the one of the shells (1) is in the form of an integrally formed clamping surface for retaining the carrier substrate (11) within the housing assembly, and the other of the housing shells (2) includes an integrally formed counter-clamping surface for further retaining the carrier substrate (11) within the housing assembly.

6. The device as set forth in claim 1, wherein the housing shells (1,2) are acoustically insulated from one another.

7. The device as set forth in claim 6, wherein the housing shells (1,2) are insulated acoustically from each other by means of the carrier substrate (11).

8. The device as set forth in claim 1, wherein the substrate-joining region of the carrier substrate includes a plurality of circuit traces terminating in a contact arrangement (14).

9. The device as set forth in claim 9, wherein the substrate-joining region (18) includes an extension (13) on which the contact arrangement (14) is located.

10. The device as set forth in claim 9, wherein the handset includes a contact element (9) positioned thereon adapted to make contact with the contact arrangement (14) upon interengagement of the interengaging means (19, 20) of the housing shells (1,2).

* * * * *